(12) United States Patent
Cerezo Lotina

(10) Patent No.: US 8,496,217 B2
(45) Date of Patent: Jul. 30, 2013

(54) PRESSURE-APPLYING TELESCOPIC SPACER

(75) Inventor: Jose Luis Cerezo Lotina, Logroño (ES)

(73) Assignee: Industrias Piqueras SA, La Rioja (ES)

( * ) Notice: Subject to any disclaimer, the term of this patent is extended or adjusted under 35 U.S.C. 154(b) by 184 days.

(21) Appl. No.: 12/885,275

(22) Filed: Sep. 17, 2010

(65) Prior Publication Data

US 2011/0068568 A1    Mar. 24, 2011

(30) Foreign Application Priority Data

Sep. 22, 2009   (ES) .................................. 200901925

(51) Int. Cl.
*A47F 5/00* (2006.01)
(52) U.S. Cl.
USPC .......................... 248/354.1; 248/351; 254/134
(58) Field of Classification Search
USPC ............. 248/354.1, 354.3, 354.4, 354.7, 351; 248/161, 406.2, 410, 411, 157; 254/93 R, 254/100, 134; 52/127.2, 111–120, 632; 403/109.1, 109.3
See application file for complete search history.

(56) References Cited

U.S. PATENT DOCUMENTS

| | | | | | |
|---|---|---|---|---|---|
| 2,483,395 | A | * | 10/1949 | Benson | 403/105 |
| 3,210,047 | A | * | 10/1965 | Jackson | 254/98 |
| 5,238,213 | A | * | 8/1993 | Pool | 248/352 |
| 5,826,847 | A | * | 10/1998 | Warner et al. | 248/354.1 |
| 5,913,783 | A | * | 6/1999 | Weener et al. | 52/127.2 |
| 6,179,514 | B1 | * | 1/2001 | Cheng | 403/377 |
| 6,247,882 | B1 | * | 6/2001 | Huang | 410/151 |
| 2011/0042539 | A1 | * | 2/2011 | Melic | 248/354.7 |

FOREIGN PATENT DOCUMENTS

| | | |
|---|---|---|
| ES | 0474270 | 3/1979 |
| ES | 0245475 | 10/1979 |
| ES | 1004562 | 10/1988 |
| ES | 1006160 | 12/1988 |
| ES | 1060333 | 8/2005 |

\* cited by examiner

*Primary Examiner* — A. Joseph Wujciak, III
(74) *Attorney, Agent, or Firm* — Defillo & Associates, Inc; Evelyn A. Defillo

(57) ABSTRACT

The present invention relates to a pressure-applying telescopic spacer formed by two attached tubes telescopically coupled to one another with sheet metal rings pushed by a spring for establishing a wedging and driving of the sheet metal rings on the inner tube and blocking the axial movement of the latter with respect to the outer tube. The assembly of sheet metal rings and push spring being located in a head belonging to a sleeve with anchoring devices for the fixing thereof on the outer tube. The body determined by the sleeve and the head or expansion forming a handle for manually handling the spacer. Support plates are connected with movable devices for adjusting the spacing length of the spacer itself to the desired measurement are included at the ends.

3 Claims, 3 Drawing Sheets

PRESSURE-APPLYING TELESCOPIC SPACER

OBJECT OF THE INVENTION

The present invention relates to a pressure-applying telescopic spacer, which constitutes a manually operated tool for the evident purpose of establishing a distance and maintaining it under stress or a load, either by supporting the ends in parallel planes, or in perpendicular planes, or in planes forming an angle with one another, linear, or others that may exist.

The object of the invention is to obtain a telescopic spacer that can work both by pressure and by pulling on the elements or portions to be spaced, providing a wide range of distances for a single level of the spacer, being versatile, structurally simple, lightweight, with instinctive and easy handling, being able to be handled using only one hand.

BACKGROUND OF THE INVENTION

Types of telescopic spacers mainly used in construction and used as props generally for supporting the formworks used in building floors, are known today.

These telescopic props are expandable and are made in multiple forms, having the common denominator that they all have unpractical locking means, in addition to being not altogether effective and difficult to being hard to handle and operate.

In relation to telescopic props of this type, there are a number of embodiments and documents corresponding to invention patents and utility models, and the publications corresponding to Spanish invention patents 0245475 and 0474270, in addition to Spanish utility models 1004562U, 1006160 U and 1060333 U, can be mentioned, among others.

DESCRIPTION OF THE INVENTION

The pressure-applying telescopic spacer that is proposed, being formed from two tubes telescopically coupled to one another, has novelty features that will be explained through the present description, which lead to advantages and new characteristics that will also be described.

More specifically, the spacer of the invention has as its main novelty features blocking means for blocking the axial movement between the tubes, these blocking means formed by sheet metal rings placed on top of one another forming a block, through which there passes with clearance the inner tube, said sheet metal rings being assembled on a part anchored on the outer tube, supported thereon through a portion or area of said rings, whereas in another opposite area or portion of said sheet metal rings there is supported and there applies pressure a spring which is intended for pivoting said rings towards a wedged (crossed) position in which the aforementioned sheet metal rings are driven into the inner tube, establishing the blocking of the latter so as to prevent its axial movement in the retracting direction with respect to the outer tube.

A manual operation on the spring pressing against the sheet metal rings will allow recovering the normal position thereof, i.e., releasing the crossed position due to the wedging thereof, and thus achieve the unblocking to allow the axial movement of the inner tube with respect to the outer tube and establish the measurement of the spacer between the two portions or surfaces between which it must be assembled.

The part for assembling the sheet metal rings used in the blocking of the two tubes of the spacer is preferably formed by a sort of sleeve assembled on the outer tube, such that one of the ends of that sleeve includes anchoring and immobilizing means for being anchored and immobilized on the outer tube, whereas the other end of such sleeve has a head-like expansion in which the sheet metal rings and the spring itself for pushing the former are arranged.

The operation for the unblocking and corresponding sliding of the inner tube with respect to the outer tube can be carried out with both hands, one of them for acting on the spring and the other one for sliding the tube, although it can also be carried out with only one hand in the vertical position of the spacer, such that in said position, if the spring is acted upon and the unblocking is established, the inner tube can slide by itself by gravity due to its own weight.

In any case, once it is set at the desired measurement, the spacer can only vary its measurement in the lengthening or extensibility direction, if the inner tube is pulled until overcoming the force of the spring, thus adopting a new dimension, thus coming closer to the required measurement or dimension.

The inner tube will be completed with a stop limiting the sliding in the extensibility direction, to prevent it from being uncoupled from the outer tube.

The spacer as a whole is complemented with respective supports provided at the free end of its tubes, the supports being formed by respective plates pivotably assembled on the ends of the tubes, such plates being able to adopt any angle, i.e., any inclination, furthermore having holes for the passage of screws or elements for fixing such plates on the bodies or surfaces to be spaced, i.e., between which the spacer is assembled.

The support plate corresponding to the end considered as the lower end, or in other words of the outer tube, is connected with a sleeve through a rod and a spring, determining an approximation mechanism which gives way when it is operated to reduce the dimension or length of the spacer, which mechanism is practical when a slight pressure is required for the spacer to be fitted or to be maintained alone while performing other complementary adjustment work.

In relation to the upper support, i.e., the one corresponding to the free end of the inner tube, the corresponding plate is connected with the tube through a threaded rod with a nut established inside the end of the tube, forming a pressure-applying mechanism, such that in the rotation of the assembly of the spacer an increase of decrease of the final distance of the spacer itself or its pressure on the surfaces between which it is applied, depending on the rotation direction carried out, will be established.

Said pressure-applying mechanism allows establishing a final approximation to the determined distance, or supplying a desired pressure thereon, in the event that the assembly of the spacer continues to be rotated once the contact has been reached.

As has already been mentioned, the pivoting assembly of the plates corresponding to the considered supports of the spacer allows such plates to be able to take on different inclinations or angles, which confers to the spacer a greater plurality since it is possible to space not only vertical levels but also inclined and even horizontal levels, provided that such plates are fixed, through their holes, to the surfaces between which the spacer is applied, which fixing can be performed on any type of surface.

It must also be emphasized that the plates will be complemented with elastic protectors to prevent sliding and marks of the surfaces to be spaced between which it is supported.

The described spacer, in addition to the features and characteristics thereof which have been mentioned, is resistance to the most severe and delicate conditions of use, without therefore having to limit the function of regulation or pressure between the distance to be delimited.

Another advantage of the spacer is its easy, simple and quick release and recovery system, allowing its use with only one hand, in addition to taking advantage of the contradictory stresses of the components and intervening parts to be self-fixed more intensely as the stressing to which it is exposed at both ends increases.

The self-sufficiency of the upper and lower supports and their pivoting and fixable assembly on the surfaces to be spaced must also be emphasized.

Another advantage is that it allows, by means of a minimal pressure, reaching its desired positioning, remaining stable in such position, prior to the position to be adopted, while it is decided whether the final arrangement of the actual spacer is that one or another one.

In addition, it must be stated that the part assembled on the outer tube, in which the sheet metal discs for blocking and the spring for pushing the former are in turn assembled, forms what can be considered as a manually operated handle for acting on said blocking means, i.e., on the sheet metal discs, as well as for increasing or decreasing the length of the spacer, for increasing the pressure on the surface of support by means of the rotation of the assembly, etc., such part, which as has been stated above has a general sleeve shape, determining a volume including and harmonizing the assembly of components which makes the spacer operate.

Finally, it must be emphasized that the spacer is reusable, with the possibility of exchanging the support plates for their use in various applications and allowing the use thereof to exert pressure or to exert pulling, in the latter case by substituting the support plates with simple hooks.

DESCRIPTION OF THE DRAWINGS

To complement the description which will be made below and for the purpose of aiding to better understand the features of the invention according to a preferred practical embodiment thereof, a set of drawings is attached as an integral part of said description, in which the following has been depicted with an illustrative and non-limiting character.

PREFERRED EMBODIMENT OF THE INVENTION

Figure 1:
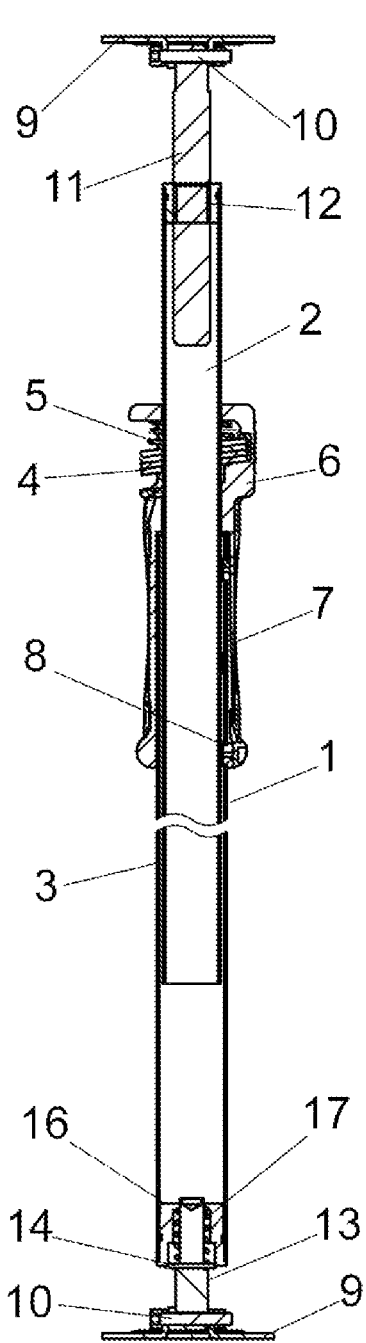
FIG. 1 shows a sectioned longitudinal elevational view of the spacer of the invention.

As can be seen in the figures, the telescopic spacer of the invention is formed from two tubes (1 and 2) telescopically coupled to one another, the inner tube (2) being provided with a stop (3) limiting the movement in the extensibility direction thereof to prevent it from being unlinked from the outer tube (1).

The blocking between tubes to prevent the extensibility and/or retraction thereof is achieved by means of sheet metal rings (4) placed on top of one another forming a joint ring through which there passes the inner tube (2) itself, which sheet metal rings (4) in the position of perpendicularity to the inner tube (2) itself allow the free movement thereof in the axial direction. However, those sheet metal rings (4) are driven by a spring (5) pressing on one of the end portions, intended for the wedging and driving of those sheet metal rings (4) on the inner tube (2) itself, since the other portion of such sheet metal rings (4) is supported on a part (6) assembled on the outer tube, which part (6) forms part of a sort of sleeve (7) provided at one of its ends with anchoring springs (8) for fixing that part (6) on the outer tube (1), since the other end, corresponding to reference number (6), forms an expansion or head in which the sheet metal rings (4) and the spring (5) itself are precisely housed, as can be clearly seen in FIGS. 1 and 2.

Furthermore, that part (6) or assembly formed by the latter with the portion of the sleeve (7) form a sort of manually operated handle for the spacer.

Figure 3:
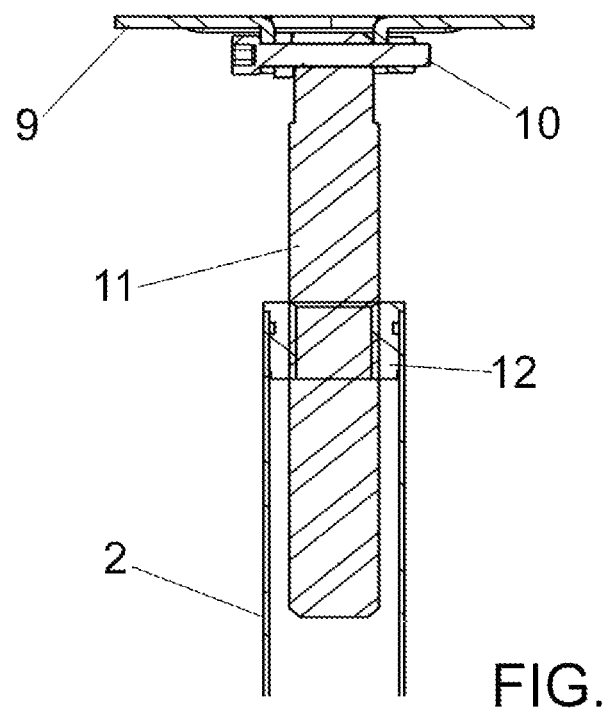
FIG. 3 shows an enlarged sectional detail corresponding to the upper end at which the pressure-applying mechanism is established.
Figure 4:
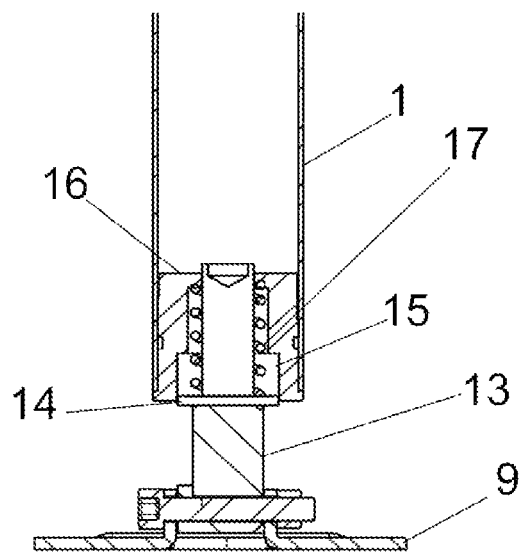
FIG. 4 shows an enlarged sectional detail of the lower end inferior at which the approximation mechanism is established.
Figure 5:
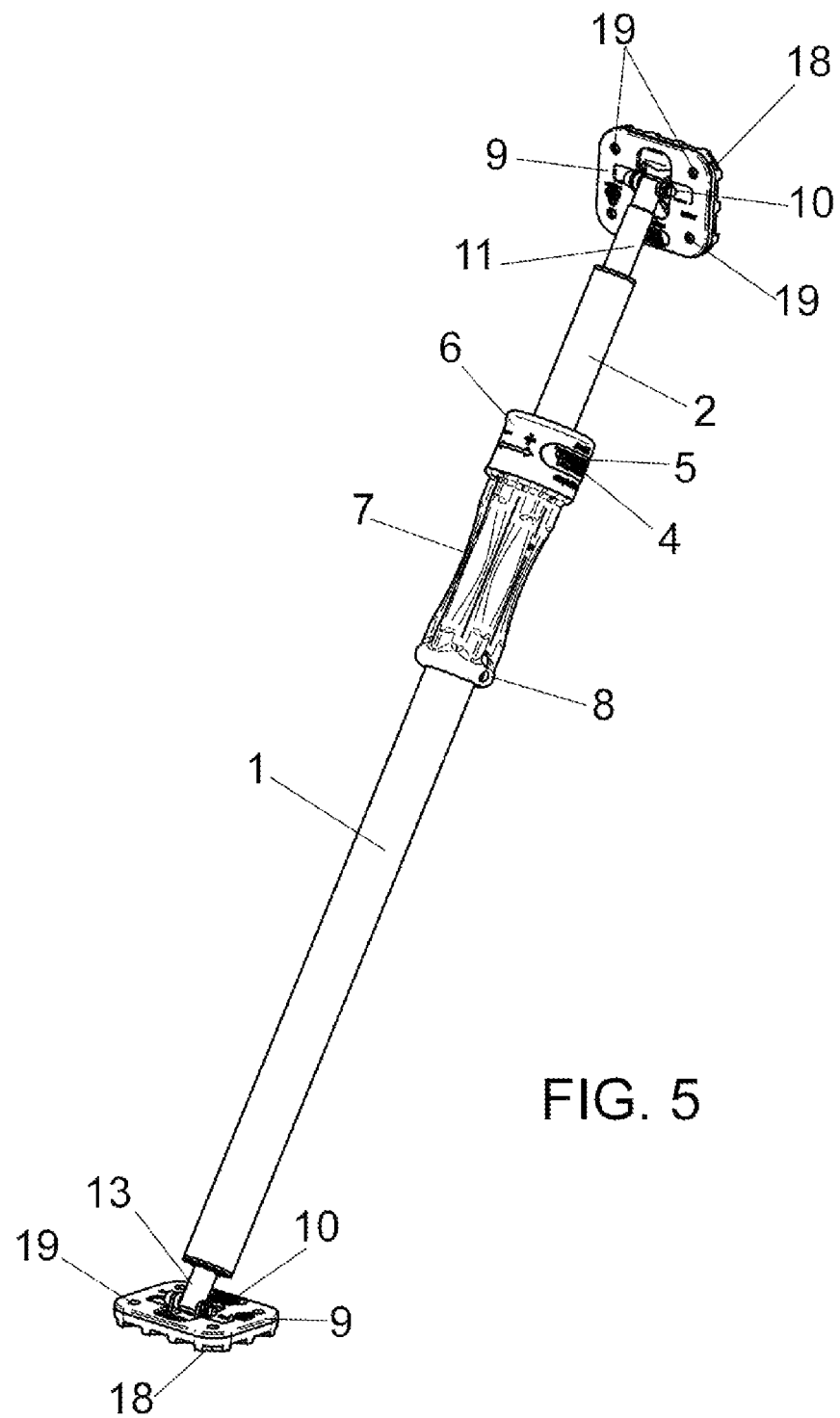
FIG. 5 finally shows a general perspective view of the spacer depicted in FIG. 1.

The positioning between the two surfaces to be spaced is performed by means of respective support plates (9) provided at the free ends of the tubes (1 and 2), such that the support plate (9) provided at the upper end, i.e., at the free end of the inner tube (2), is pivotably assembled through a pin or similar element with respect to a threaded rod (11), which is in turn screwed onto a threaded sleeve (12) established at the end of the inner tube (2), as can be seen in the detail of FIG. 3.

The lower support plate (9), corresponding to the end of the outer tube (1), is in turn also pivotably assembled through another shaft or pin (10), like the one mentioned above, and which pivoting is performed with respect to a rod (13) projecting from the plate (9) itself, which rod has a limit flange (14) against the bottom (15) of a slot established in a sleeve (16) provided at the lower end of the outer tube, there being a spring (17) between the aforementioned limit flange (14) and the bottom of the sleeve (16).

This form of linking the end support plates (9) on the support ends (1 and 2) form pressure and approximation mechanisms, respectively, since in the first case in the rotation of the assembly of the spacer an increase or decrease of the final distance of such spacer due to its pressure on the surfaces between which it is applied, according to the rotation direction carried out, will be established, allowing a final approximation to the desired distance, or supplying pressure, until the plate (9) reaches the contact or support, if the assembly of the spacer continues to be rotated, whereas in the second case it is possible to considerably reduce the dimension or length of the spacer until the limit flange (14) reaches the bottom (15) of the sleeve (16), which is useful and practical when a slight pressure is required for the spacer to move or to be maintained only while performing other complementary work or adjustment.

Finally, it must be stated that the support plates (9) can be complemented with a protective and non-slip surface (18) to prevent not only the sliding but also friction on the surfaces in which it is applied, which plates (9) in turn have through holes (19) for screws for fixing them to the surface in which they are applied.

Figure 2:
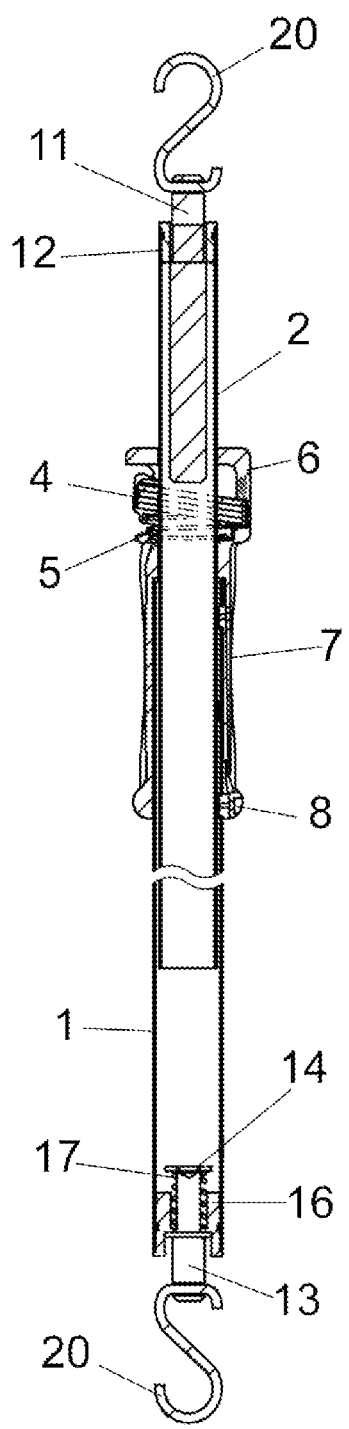
FIG. 2 shows the same spacer of the previous figure, but incorporating at the ends the hooks for pulling the spacer instead of the support plates.

Finally, it must be stated that the mentioned plates (9) can be exchanged and substituted with hooks (20), as depicted in FIG. 2, and the spacer can be used as a pulling element instead of a pressure-applying element according to what has been mentioned above, with the particularity that in this case, i.e., in the embodiment of FIG. 2 or when the spacer includes the hooks (20), the arrangement of the sheet metal discs (4) and the spring (5) is then reverse to the one shown in FIG. 1, and the same occurs with the limit flange (14) which is in the reverse situation, as can be clearly seen in this FIG. 2.

What is claimed is:

1. A pressure-applying telescopic spacer comprising:
an outer tube;
an inner tube telescopically coupled to the outer tube;
a sleeve securely fixed to the outer tube, the sleeve having a head having an interior expansion chamber, and a hollow elongated body;
a block formed by a plurality of metal rings in direct contact with each other, the block is placed inside the interior expansion chamber, the block having a top end and a bottom end, the inner tube passes through the block;
a first spring placed inside the interior expansion chamber between the top end of the block and a top end of the interior expansion chamber;
an anchoring spring placed between the outer tube and the hollow elongated body, the anchoring spring anchors the hollow elongated body to the outer tube;
a first end support plate pivotally connected to a free end of the inner tube;
a second end support plate pivotally connected to a free end of the outer tube;
wherein when a force is applied to the first spring, the metal rings move from a horizontal position to an inclined position blocking an axial movement of the inner tube; and
wherein the expansion chamber projects away from the sleeve forming an external handle, rotating the external handle adjusts a length of the pressure-applying telescopic spacer by acting on the first spring to increase or decrease the pressure on surfaces of support.

2. The pressure-applying telescopic spacer according to claim 1, further including a non-slip surface secured to an outer end of the first support end plate and an outer end of the second end support plate.

3. A pressure-applying telescopic spacer comprising:
an outer tube;
an inner tube telescopically coupled to the outer tube;
a sleeve securely fixed to the outer tube, the sleeve having a head having an interior expansion chamber, and a hollow elongated body;
a block formed by a plurality of metal rings in direct contact with each other, the block is placed inside the interior expansion chamber, the block having a top end and a bottom end, the inner tube passes through the block;
a first spring placed inside the interior expansion chamber between the top end of the block and a top end of the interior expansion chamber;
an anchoring spring placed between the outer tube and the hollow elongated body, the anchoring spring anchors the hollow elongated body to the outer tube;
a first end support plate pivotally connected to a free end of the inner tube, the first support end plate is connected to the inner tube through a pin connected to a threaded rod screwed onto a threaded sleeve located at the free end of the inner tube producing an adjustable length pressure-applying mechanism;
a second end support plate pivotally connected to a free end of the outer tube, the second end support plate is connected to the outer tube through a rod projected from the second support end plate, the rod has a limit flange against a bottom of a slot in a second sleeve located on the free end of the outer tube, a second spring is located between the limit flange and the second sleeve;
wherein when a force is applied to the first spring, the metal rings move from a horizontal position to an inclined position blocking an axial movement of the inner tube; and
wherein the expansion chamber projects away from the sleeve forming an external handle, rotating the external handle adjusts a length of the pressure-applying telescopic spacer by acting on the first spring to increase or decrease the pressure on surfaces of support.

* * * * *